United States Patent
Ward et al.

(10) Patent No.: US 6,784,267 B1
(45) Date of Patent: Aug. 31, 2004

(54) POLYMERS CONTAINING HYPERBRANCHED MONOMERS

(75) Inventors: William J. Ward, Glen Ellyn, IL (US); Ananthasubramanian Sivakumar, Mumbai (IN)

(73) Assignee: Nalco Company, Naperville, IL (US)

( * ) Notice: Subject to any disclaimer, the term of this patent is extended or adjusted under 35 U.S.C. 154(b) by 183 days.

(21) Appl. No.: 10/205,282

(22) Filed: Jul. 25, 2002

(51) Int. Cl.$^7$ ............................................. C08F 120/34
(52) U.S. Cl. ................. 526/311; 526/303.1; 526/307.2; 526/307.5; 526/307.7; 526/312; 526/328.5; 524/555; 524/560; 210/733; 210/734
(58) Field of Search ........................... 526/303.1, 307.2, 526/307.5, 307.7, 311, 312, 328.5; 524/555, 560; 210/733, 734

(56) References Cited

U.S. PATENT DOCUMENTS

| | | |
|---|---|---|
| 4,720,346 A | 1/1988 | Flesher et al. |
| 4,943,378 A | 7/1990 | Flesher et al. |
| 6,252,025 B1 * | 6/2001 | Wang et al. ............. 526/292.9 |
| 6,258,896 B1 * | 7/2001 | Abuelyaman et al. ...... 525/437 |
| 6,287,552 B1 * | 9/2001 | Tournilhac et al. ...... 424/78.03 |
| 6,559,233 B2 * | 5/2003 | Bavouzet et al. ........... 525/244 |

FOREIGN PATENT DOCUMENTS

| | | |
|---|---|---|
| EP | 0 374 458 A2 | 6/1990 |
| WO | WO 97/19987 | 6/1997 |
| WO | WO 98/12376 | 3/1998 |

OTHER PUBLICATIONS

Anders Hult, "Hydrobranched Polymers", *Encyclopedia of Polymer Science and Technology*, John Wiley & Sons, Inc. (1991).

"HybraneTM, DSM's New Dendritic Polymers", DSM New Business Development, Geleen, The Netherlands.

* cited by examiner

*Primary Examiner*—Helen L. Pezzuto
(74) *Attorney, Agent, or Firm*—Michael B. Martin; Thomas M. Breininger

(57) ABSTRACT

A water-soluble, cationic polymer comprising from about 1 to about 65 mole percent of one or more cationic monomers, from about 99 to about 35 mole percent of one or more nonionic monomers and from about 1 to about 1000 ppm, based on the total monomer content, of one or more hyperbranched monomers wherein the hyperbranched monomer contains from about 2 to about 20 allyl, vinyl, or acrylic end groups and method of dewatering sludge is disclosed.

16 Claims, No Drawings

POLYMERS CONTAINING HYPERBRANCHED MONOMERS

TECHNICAL FIELD

This invention concerns polymers containing hyperbranched monomers, methods of preparing the polymers and use of the polymers for dewatering municipal and industrial sludges.

BACKGROUND OF THE INVENTION

The dewatering of municipal and industrial sludges containing suspended organic solids is typically accomplished by mixing the sludge with one or more chemical reagents in order to induce a state of coagulation or flocculation of the solids which are then separated from the water using mechanical devices such as plate and frame filter presses, belt-filter presses, centrifuges, and the like.

For example, in a typical municipal sewage plant, waste water remaining after coarse solids are settled out of the incoming sewage influent is conveyed into a biological clarifying stage, where the dissolved and suspended organic material is decomposed by microorganisms in the presence or absence of air. These processes are referred to as aerobic fermentation and anaerobic fermentation, respectively.

The organic matter obtained as a result of this decomposition is largely bound in the form of a mass of microorganisms. This mass is precipitated as an activated sludge. The water may be released into waterways or allowed to seep away in sewage irrigation fields, but the activated sludge must be dewatered prior to disposal.

The objective of dewatering processes is to maximize the efficiency of water removal, as decreasing the amount of water retained in the dewatered solids leads decreased transport and disposal costs. Therefore, there is an ongoing need for improved dewatering technologies.

SUMMARY OF THE INVENTION

In its principal aspect, this invention is directed to a water-soluble, cationic polymer prepared by polymerizing from about 1 to about 65 mole percent of one or more cationic monomers, from about 99 to about 35 mole percent of one or more nonionic monomers and from about 1 to about 1000 ppm, based on the total monomer content, of one or more hyperbranched monomers.

DETAILED DESCRIPTION OF THE INVENTION

"Alkyl" means a monovalent group derived from a straight or branched chain saturated hydrocarbon by the removal of a single hydrogen atom. Representative alkyl groups include methyl, ethyl, n- and iso-propyl, n-, sec-, iso- and tert-butyl, and the like. A preferred alkyl group is methyl.

"Reduced Specific Viscosity" (RSV) is an indication of polymer chain length and average molecular weight. The RSV is measured at a given polymer concentration and temperature and calculated as follows:

$$RSV = \frac{\left[\left(\frac{\eta}{\eta_0}\right) - 1\right]}{c}$$

wherein $\eta$=viscosity of polymer solution;
$\eta_0$=viscosity of solvent at the same temperature; and
c=concentration of polymer in solution.
As used herein, the units of concentration "c" are (grams/100 ml or g/deciliter). Therefore, the units of RSV are dl/g. The RSV is measured at 30° C. The viscosities $\eta$ and $\eta_0$ are measured using a Cannon-Ubbelohde semimicro dilution viscometer, size 75. The viscometer is mounted in a perfectly vertical position in a constant temperature bath adjusted to 30±0.02° C. The error inherent in the calculation of RSV is about 2 dl/g. Similar RSVs measured for two linear polymers of identical or very similar composition is one indication that the polymers have similar molecular weights, provided that the polymer samples are treated identically and that the RSVs are measured under identical conditions.

IV stands for intrinsic viscosity, which is RSV in the limit of infinite polymer dilution (i.e. the polymer concentration is equal to zero). The IV, as used herein, is obtained from the y-intercept of the plot of RSV versus polymer concentration in the range of 0.015–0.045 wt % polymer.

"Huggins Coefficient" means the slope obtained from plotting the reduced specific viscosity (RSV) versus polymer concentration in the range of 0.015–0.045 wt % polymer. In general, a Huggins coefficient greater than one indicates a more three-dimensional polymer conformation in solution which occurs, for example, when a cationic polymer is complexed with anionic substances such as PGA.

"Monomer" means a polymerizable allylic, vinylic or acrylic compound. The monomer may be anionic, cationic or nonionic. Vinyl monomers are preferred, acrylic monomers are more preferred.

"Cationic Monomer" means a monomer as defined herein which possesses a net positive charge. Representative cationic monomers include dialkylaminoalkyl acrylates and methacrylates and their quaternary or acid salts, including, but not limited to, dimethylaminoethyl acrylate methyl chloride quaternary salt, diethylaminoethyl acrylate methyl chloride quaternary salt, dimethylaminoethyl acrylate methyl sulfate quaternary salt, dimethylaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride. Alkyl groups are generally $C_{1-4}$ alkyl. Preferred cationic monomers are dimethylaminoethyl acrylate methyl chloride quaternary salt and dimethylaminoethyl acrylate benzyl chloride quaternary salt, "Nonionic monomer" means a monomer as defined herein which is electrically neutral. Representative nonionic monomers include acrylamide, methacrylamide, N-methylacrylamide, N, N-dimethyl(meth)acrylamide, N-isopropyl(meth)acrylamide, N-(2-hydroxypropyl) methacrylamide, N-methylolacrylamide, N-vinylformamide, N-vinylacetamide, N-vinyl-N-methylacetamide, poly(ethylene glycol)(meth)acrylate, poly (ethylene glycol) monomethyl ether mono(meth)acryate, N-vinyl-2-pyrrolidone, glycerol mono((meth)acrylate), 2-hydroxyethyl(meth)acrylate, vinyl methylsulfone, vinyl acetate, and the like. Preferred nonionic monomers include acrylamide and methacrylamide. Acrylamide is more preferred.

"Hyperbranched polyesteramide" means a highly branched macromolecule prepared by polycondensation of cyclic anhydrides where the branches are terminated by tertiary amine end groups. Typically, the hyperbranched polyesteramide has a molecular weight of from about 300 to about 30,000 and from about 2 to about 20 tertiary amine end groups. Preferred hyperbranched polyesteramides have a molecular weight of from about 500 to about 10,000 and from about 3 to about 15 tertiary amine end groups. More preferred hyperbranched polyesteramides have a molecular weight of from about 1000 to about 3,000 and from about 4 to about 10 tertiary amine end groups.

The preparation of a representative hyperbranched polyesteramide having 8 terminal tertiary amine groups is shown in Scheme 1. In Scheme 1, $R_1$ and $R_2$ are independently $C_1$–$C_{20}$ alkyl, or $R_1$ and $R_2$ taken together form a $C_5$–$C_8$ cycloalkyl or phenyl; $L_1$ and $L_2$ are independently $C_1$–$C_4$ alkyl; and $R_3$ and $R_4$ are independently $C_1$–$C_4$ alkyl. While anhydride I is shown as a succinic anhydride derivative for purposes of illustration, it is understood that the reactions shown in Scheme 1 are generally applicable and not limited to the ring structure shown.

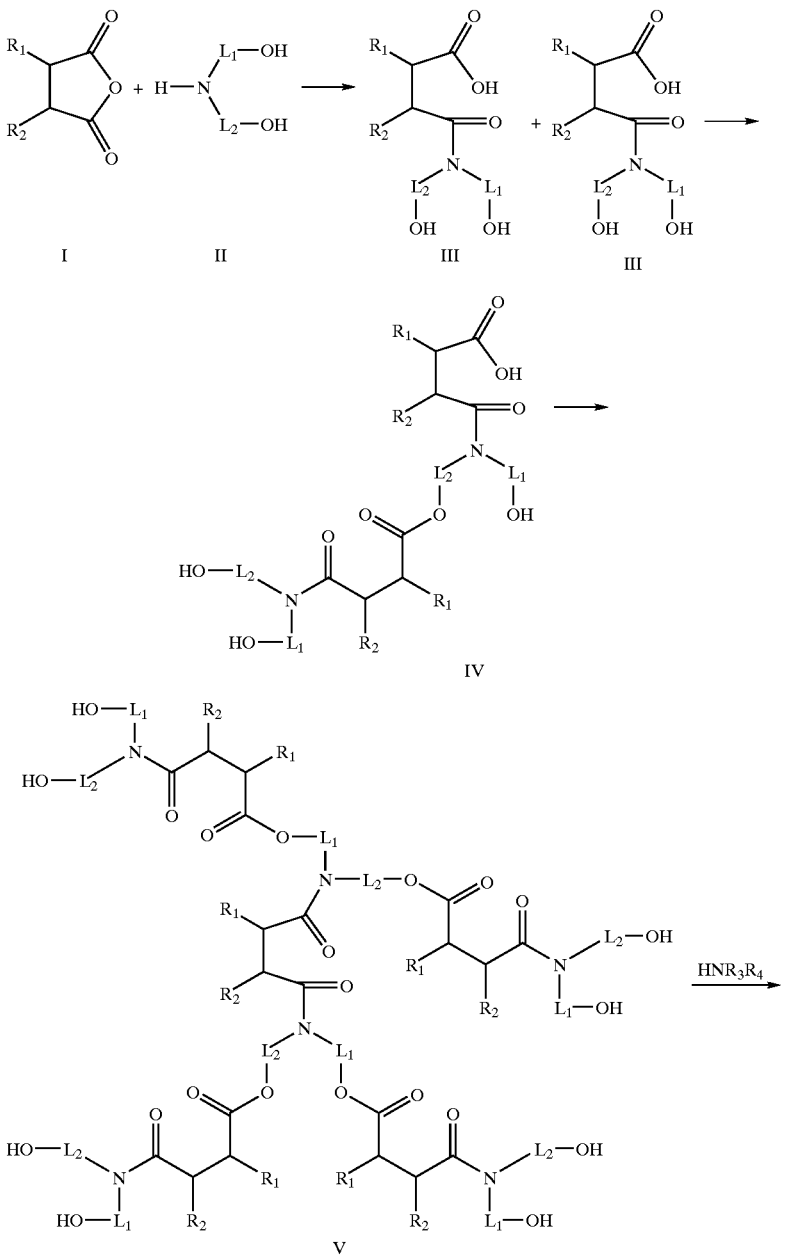

-continued

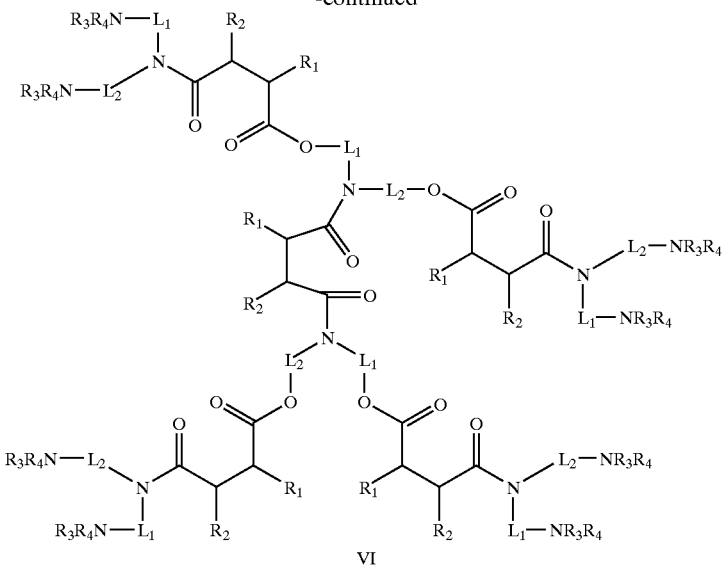

VI

For a detailed description of the preparation of hyperbranched polyesteramides see "HYBRANE™, DSM's New Dendritic Polymers", Publication 99-2c, DSM New Business Development, Geleen, The Netherlands and A. Hult, *Hyperbranched Polymers*, Encyclopedia of Polymer Science and Technology, John Wiley & Sons, (2002), and references cited therein.

Representative anhydrides I suitable for use in the polycondensation reaction of Scheme 1 include succinic anhydride, methylsuccinic anhydride, 2,2-dimethylsuccinic anhydride, glutaric anhydride, 2,2-dimethyl glutaric anhydride, 3,3-dimethylglutaric anhydride, phthalic anhydride, hexahydrophthalic anhydride, dodecenylsuccinic anhydride, maleic anhydride, and the like.

Representative aminodiols (II) include diisopropanolamine, diethanolamine, and the like.

Representative secondary amines $HNR_3R_4$ (III) include 3,3'-iminobis(N,N-dimethylpropyl amine), N,N,N',N'-tetraethylenetriamine, and the like.

"Hyperbranched monomer" means a polymerizable hyperbranched polyesteramide containing vinyl, allyl or acrylic end groups. Hyperbranched monomers are prepared by quaternizing the terminal tertiary amine end groups of a hyperbranched polyesteramide with one or more allyl-, vinyl- or acrylic-group containing compounds as shown in Scheme 2 where $R_5$ represents the allyl-, vinyl- or acrylic-containing group. Representative allyl-, vinyl- or acrylic-group containing compounds include vinyl benzyl chloride, allyl glycidyl ether, allyl chloride, glycidyl methacrylate, and the like.

Scheme 2

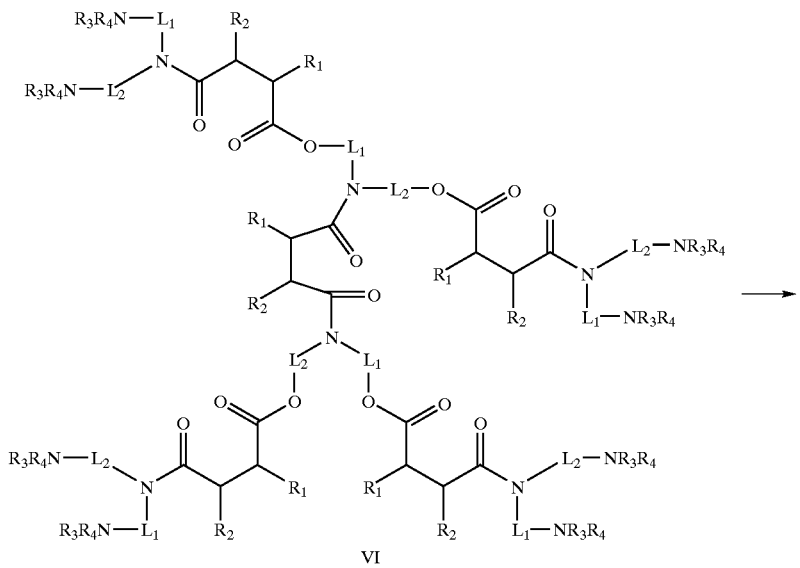

VI

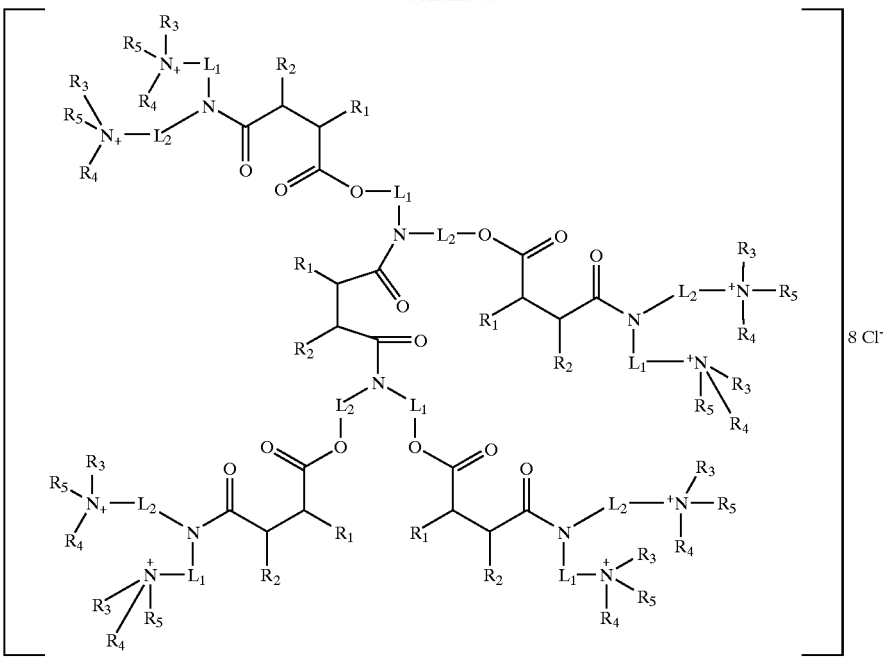

VII

The polymers of this invention may be latex polymers, dispersion polymers or gel polymers.

Preferred cationic polymers of this invention have a cationic charge of from about 30 to about 60 mole percent. More preferred polymers have a cationic charge of from about 45 to about 55 mole percent.

"Latex polymer" means an invertible water-in-oil polymer emulsion comprising a cationic polymer according to this invention in the aqueous phase, a hydrocarbon oil for the oil phase, a water-in-oil emulsifying agent and, potentially, an inverting surfactant. Inverse emulsion polymers are hydrocarbon continuous with the water-soluble polymers dispersed as micron sized particles within the hydrocarbon matrix. The advantages of polymerizing water-soluble monomers as inverse emulsions include 1) low fluid viscosity can be maintained throughout the polymerization, permitting effective mixing and heat removal, 2) the products can be pumped, stored, and used easily since the products remain liquids, and 3) the polymer "actives" or "solids" level can be increased dramatically over simple solution polymers, which, for the high molecular weight flocculants, are limited to lower actives because of viscosity considerations. The inverse emulsion polymers are then "inverted" or activated for use by releasing the polymer from the particles using shear, dilution, and, generally, another surfactant, which may or may not be a component of the inverse emulsion.

Inverse emulsion polymers are prepared by dissolving the desired monomers in the aqueous phase, dissolving the emulsifying agent(s) in the oil phase, emulsifying the water phase in the oil phase to prepare a water-in-oil emulsion, in some cases, homogenizing the water-in-oil emulsion, polymerizing the monomers dissolved in the water phase of the water-in-oil emulsion to obtain the polymer as a water-in-oil emulsion. If so desired, a self-inverting surfactant can be added after the polymerization is complete in order to obtain the water-in-oil self-inverting emulsion.

The oil phase comprises any inert hydrophobic liquid. Preferred hydrophobic liquids include aliphatic and aromatic hydrocarbon liquids including benzene, xylene, toluene, paraffin oil, mineral spirits, kerosene, naphtha, and the like. A paraffinic oil is preferred.

Free radical yielding initiators such as benzoyl peroxide, lauroyl peroxide, 2,2'-azobis (isobutyronitrile) (AIBN), 2,2'-azobis(2,4-dimethylvaleronitrile) (AIVN), potassium persulfate and the like are useful in polymerizing vinyl and acrylic monomers. 2,2'-azobis(isobutyronitrile) (AIBN) and 2,2'-azobis(2,4-dimethylvaleronitrile) (AIVN) are preferred. The initiator is utilized in amounts ranging between about 0.002 and about 0.2 percent by weight of the monomers, depending upon the solubility of the initiator.

Water-in-oil emulsifying agents useful for preparing the latex polymers of this invention include sorbitan esters of fatty acids, ethoxylated sorbitan esters of fatty acids, and the like or mixtures thereof Preferred emulsifying agents include sorbitan monooleate, polyoxyethylene sorbitan monostearate, and the like. Additional details on these agents may be found in McCutcheon's *Detergents and Emulsifiers*, North American Edition, 1980. Any inverting surfactant or inverting surfactant mixture described in the prior art may be used. Representative inverting surfactants include ethoxylated nonylphenol, ethoxylated linear alcohols, and the like. Preferred inverting surfactants are ethoxylated linear alcohols.

The polymer is prepared by polymerizing the appropriate monomers at from about 30° C. to about 85° C. over about 1 to about 24 hours, preferably at a temperature of from about 40° C. to about 70° C. over about 3 to about 6 hours.

The latex polymers of this invention preferably have an RSV of from about 4 to about 8 dL/g and contain from about 5 to about 400 ppm, based on total monomer weight, of hyperbranched monomers. More preferred latex polymers of this invention contain from about 8 to about 225 ppm of hyperbranched monomers.

"Dispersion polymer" means a water-soluble polymer dispersed in an aqueous continuous phase containing one or more inorganic salts. Representative examples of dispersion polymerization of water-soluble polymers in an aqueous continuous phase can be found in: U.S. Pat. Nos. 4,929,655, 5,006,590, 5,597,859 and 5,597,858; and in European Patent Nos. 657,478 and 630,909.

Dispersion polymers are prepared by combining water, one or more inorganic salts, one or more water-soluble monomers, any polymerization additives such as chelants, pH buffers or chain transfer agents, and a water-soluble stabilizer polymer. This mixture is charged to a reactor equipped with a mixer, a thermocouple, a nitrogen purging tube, and a water condenser. The monomer solution is mixed vigorously, heated to the desired temperature, and then a water-soluble initiator is added. The solution is purged with nitrogen whilst maintaining temperature and mixing for several hours. During the course of the reaction, a discontinuous phase containing the water-soluble polymer is formed. After this time, the products are cooled to room temperature, and any post-polymerization additives are charged to the reactor. Water continuous dispersions of water-soluble polymers are free flowing liquids with product viscosities generally 100–10,000 cP, as measured at low shear. The advantages of preparing water-soluble polymers as water continuous dispersions are similar to those already mentioned in association with the inverse emulsion polymers. The water continuous dispersion polymers have the further advantages that they contain no hydrocarbon oil or surfactants, and require no surfactant for "inversion" or activation.

The cationic dispersion polymers of this preferably have an RSV of from about 5 to about 12 dL/g and contain from about 50 to about 500 ppm, based on total monomer weight, of hyperbranched monomers. More preferred dispersion polymers of this invention contain from about 100 to about 300 ppm of hyperbranched monomers.

A "gel" polymerization is defined as a process for producing polymers as dry powders. The preparation of high molecular weight water-soluble polymers as dry powders using a gel polymerization is generally performed as follows. An aqueous solution of water-soluble monomers, generally 20–60 percent concentration by weight, along with any polymerization or process additives such as chain transfer agents, chelants, pH buffers, or surfactants, is placed in an insulated reaction vessel equipped with a nitrogen purging tube and cooled in an ice bath. Polymerization initiator (s) are added to the cooled solution, the solution is purged with nitrogen, and the temperature of the reaction is allowed to rise uncontrolled. When the polymerized mass is cooled, the resultant gel is removed from the reactor, shredded, dried in an oven to a moisture content of about 10 percent, and ground to the desired particle size.

Preferred Embodiments

In a preferred aspect of this invention, the hyperbranched monomer contains from about 3 to about 15 allyl, vinyl, or acrylic end groups.

In another preferred aspect, the hyperbranched monomer contains from about 4 to about 10 allyl, vinyl, or acrylic end groups.

In another preferred aspect, the cationic monomers are selected from the group consisting of dialkylaminoalkyl acrylates and methacrylates and their quaternary or acid salts.

In another preferred aspect, the nonionic monomers are selected from acrylamide and methacrylamide.

In another preferred aspect, the hyperbranched monomer is a hyperbranched polyesteramide wherein the branches are terminated by tertiary amine end groups quaternized with allyl benzyl chloride, allyl chloride, allyl glycidyl ether or glycidyl methacrylate.

In another preferred aspect, the hyperbranched polyesteramide is a polycondensate of diisopropanolamine and hexahydrophthalic anhydride.

In another preferred aspect, the polymer is selected from the group of dispersion polymers and latex polymers having a RSV of from about 4 to about 12 dL/g.

In another preferred aspect, the polymer is a dispersion polymer that contains from about 50 to about 500 ppm, based on total monomer content, of hyperbranched monomer and has a RSV of from about 5 to about 12.

In another preferred aspect, the polymer is a dispersion polymer that contains from about 100 to about 300 ppm, based on total monomer content, of hyperbranched monomer and has a RSV of from about 5 to about 12 dL/g.

In another preferred aspect, the polymer is a latex polymer that contains from about 5 to about 400 ppm, based on total monomer content, of hyperbranched monomer and has a RSV of from about 4 to about 8.

In another preferred aspect, the polymer is a latex polymer that contains from about 8 to about 225 ppm, based on total monomer content, of hyperbranched monomer and has a RSV of from about 5 to about 12 dL/g.

In another aspect, this invention is directed to a method of dewatering sludge comprising
i) adding to the sludge an effective amount of one or more cationic, water-soluble polymers comprising from about 1 to about 65 mole percent of one or more cationic monomers, from about 99 to about 35 mole percent of one or more nonionic monomers and from about 1 to about 1000 ppm, based on the total monomer content, of one or more hyperbranched monomers wherein the hyperbranched monomer contains from about 2 to about 20 allyl, vinyl, or acrylic end groups to form a mixture of water and coagulated and flocculated solids and
ii) separating the coagulated and flocculated solids from the water.

The effective doses of polymer depend on the properties of the sludge being treated and can be empirically determined by one of skill in the art. In general, the dose of polymer is from about 100 to about 5000 ppm, preferably from about 200 to about 1000 ppm and more preferably from about 150 to about 500 ppm, based on the dry weight of the sludge.

In a preferred aspect, the sludge is selected from the group consisting of municipal and industrial sludges.

In another preferred aspect, the sludge is a municipal sludge.

In another preferred aspect, the sludge is an activated sludge.

The polymers of this invention are preferably used in processes employing a centrifuge apparatus, screw press, plate and frame, belt press or vacuum filter equipment to concentrate and dewater the sludge. The polymers are most effective in applications using equipment which places a high degree of shear force on the flocculated sludge particles, such as the centrifuge and screw press.

The polymer is typically dosed continuously into the waste stream just prior to the dewatering process.

The effective polymer dose varies depending on the characteristics of the sludge and the type of dewatering equipment utilized and is empirically determined by one of ordinary skill in the art. In general, the polymer dose is from about 100 to about 500 ppm, preferably from about 200 to about 1000 ppm and more preferably from about 150 to about 550 ppm, based on polymer solids.

The polymers of this invention may be used in combination with one or more inorganic or polymeric coagulants. Polymeric coagulants useful in the process of this invention are typically polyamines such as epichlorohydrin-dimethylamine having molecular weights in the range of 20,000 to 1 million.

The dose of coagulant depends on the properties of the sludge being treated and can be empirically determined by one of skill in the art. In general, the flocculant polymer dose is from about 100 ppm to about 600 ppm, preferably from about 200 to about 600 ppm, based on polymer solids, per dry ton solids.

The foregoing may be better understood by reference to the following examples, which are presented for purposes of illustration and are not intended to limit the scope of this invention.

In the following Examples, HYBRANE™ HA1695 refers to a water soluble hyperbranched poly(esteramide) resin prepared from hexahydrophthalic acid and diisopropanol amine having an average molecular weight of about 1300–1700 g/mol and containing on average eight end groups terminated with dimethylamino groups. HYBRANE™ HA1695 is available from DSM New Business Development, Geleen, the Netherlands. The accompanying certificate of analysis recites a tertiary amine value of 4.29 meq./g of sample.

Allyl glycidyl ether and vinyl benzyl chloride are available from the Aldrich Chemical Co, Milwaukee, Wis. Monomers used are available from Ondeo Nalco Company, Naperville, Ill.

EXAMPLE 1
Preparation of a Hyperbranched Monomer containing Multiple Vinyl Benzylic Moities HA1695 (10 g) is dissolved at ambient temperature in 150 mL of dry acetonitrile containing a small amount of MEHQ inhibitor in a reaction flask equipped with a thermocouple, magnetic stir bar and reflux condenser. To the homogenous solution is added vinylbenzyl chloride (7.52 g, 15% molar excess based on tertiary amine groups) of vinylbenzyl chloride. The solution is stirred and heated to 60–65° C. After two hours the solution becomes turbid and the reaction temperature is raised to 70° C. and maintained at this temperature for an additional 1.5 hours. The reaction mixture is then cooled to 43° C. and stirred overnight. At the end of this time the solvent is removed leaving an intractable heavy oil. The oil product is dried under a high vacuum at room temperature for 24 hours to give a slightly yellow highly hydroscopic amorphous solid (13 g). NMR results are consistent with the expected structure, and indicate that on average 7 vinyl benzyl groups per HA1695 molecule are incorporated into the product.

EXAMPLE 2
Preparation of a Hyperbranched Monomer containing Multiple Allylic Ether Moities HA1695 (5 g) is dissolved in 25 mL of water containing a small amount of MEHQ inhibitor in a reaction flask equipped with a thermocouple, magnetic stir bar and reflux condenser. The homogeneous solution is adjusted to pH 9 using an HCl solution (4.1 g), which is prepared by adding 10 g of concentrated HCl solution to 40 mL of water. Allyl glycidyl ether (2.45 g, 10% molar excess based on tertiary amine groups) is added and the reaction mixture is stirred and heated to 40° C. The pH of the reaction mixture is maintained at 9.0–9.5 during the first hour (adjusting with the HCl solution described above). After 1 hour the pH is maintained at 9.5–10.0. After 4.5 hours the reaction is cooled to ambient temperature and the pH adjusted to 4.5–5.5. The mixture is then stirred at room temperature overnight, after which it is added to a large volume of acetone until a yellow oil is obtained. The oil is isolated from the solvents and dried under vacuum at ambient temperature to give an amorphous yellow solid (5 g) which is highly hydroscopic. NMR analysis indicates that an average of 7 allylic ether groups are incorporated into the Hybrane 1695 molecule.

Example 3
Preparation of Oil Continuous Phase Acrylamide/Dimethylaminoethylacrylate Methyl Chloride Salt Emulsion Latex Polymer Flocculant Containing Hyperbranched Monomers The following method describes the general preparation of the experimental latex flocculants. These reactions are performed in a 1.5 L reaction kettle equipped with a multi-neck reaction head. The reactor is fitted with a reflux condenser, a nitrogen inlet and outlet, a thermocouple probe, a chemical addition port and a mechanical stirring shaft, along with a heating and cooling element. The stirring shaft is equipped with a lower half-moon Teflon stir paddle, and an upper flat blade impeller.

An aqueous monomer phase is prepared by combining, in a large beaker, acrylamide (162.71 g, 49.5% aqueous solution), dimethylaminoethyl acrylate methyl chloride salt (DMAEA.MCQ, 274.23 g, 80.0% aqueous solution), adipic acid (10.00 g), NaCl (30.00 g), ethylenediamine tetraacetic acid, tetrasodium salt (0.20 g) and deionized water (234.5 g). Hyperbranched monomer, prepared as in Examples 1 and 2, is then added to the mixture. The amount is varied and is based on the weight of the monomer actives in ppm. For example, a 150 ppm level of hyperbranched monomer requires 0.050 g of the reagent. The pH of the mixture is adjusted to pH 4.0 with a small amount of 50% aqueous NaOH solution.

The oil phase is prepared by adding Span 80 (sorbitan monooleate, 9.00 g, ICI Specialty Chemicals, Wilmington, Del.) and Tween 61 (POE (4) sorbitan monostearate, 19.00 g, ICI Specialty Chemicals, Wilmington, Del.,) to Escaid 110 oil (260 g, Exxon Chemical Co., Baytown, Tex.). This mixture is stirred and warmed until homogeneous.

The oil phase is then added to the reactor and stirring is initiated (600 rpm). The monomer phase is then added to the reactor over a period of three minutes, the stirring rate is increased to 1000 rpm and the temperature increased to exactly 42° C. Vazo 64 (2,2'-azobis(isobutyronitrile), 0.33 g, E.I. duPont de Nemours and Company, Wilmington, Del.) and Vazo 52 (2,2'-azobis(2,4-dimethylpentanenitrile, 0.05 g, E.I. duPont de Nemours and Company, Wilmington, Del.) initiators are added to the reactor, the reactor is sealed and a nitrogen purge is started and maintained throughout the reaction. After 3 hours the temperature is increased and held at 45° C. for one hour. Then the temperature is increased to 70° C. and held for an additional hour. At the end of this time the reaction is cooled and the latex product collected. Thus, a 50 mole % cationic polymer having 30% polymer actives is obtained.

EXAMPLE 4
Preparation of High Polymer Solids Oil Continuous Phase Acrylamide/Dimethylaminoethylacrylate Methyl Chloride Salt Emulsion Latex Polymer Flocculant Containing Hyperbranched Monomers This example describes the preparation of latex flocculants containing 42.8% polymer actives. The equipment used is identical to that described in Example 3.

An aqueous monomer phase is prepared by combining, in a large beaker, acrylamide (211.29 g, 48.9% aqueous solution), DMAEA.MCQ (351.13 g, 80.2% aqueous solution), adipic acid (9.00 g), Versene chelant (0.12 g) and deionized water (46.50 g). Hyperbranched monomer, prepared as described in Examples 1 and 2, is then added to the mixture. The amount is varied based on the weight of the monomer actives in ppm. For example, a 50 ppm level of hyperbranched monomer required 0.0192 g of the reagent. The pH of the mixture is then adjusted to pH 4.0 with a small amount of 50% aqueous NaOH solution (if needed).

The oil phase is prepared as described in Example 3.

The oil phase is then added to the reactor and stirring is initiated (600 rpm). The monomer phase is added to the reactor over three minutes, the stirring rate is increased to 1000 rpm and the temperature increased to exactly 42° C. Vazo 64 (0.297 g) and Vazo 52 (0.045 g) initiators are added to the reactor, the reactor is sealed, and a nitrogen purge is then started and maintained throughout the reaction. After 3 hours the temperature is increased and maintained at 45° C. for one hour. Then the temperature is increased to 70° C. and maintained for an additional hour. At the end of this time the reaction is cooled and the latex product collected. Thus, a 50 mole % cationic polymer having 42.8% polymer actives is obtained.

EXAMPLE 5

Preparation of an Acrylamide/Dimethylaminoethylacrylate Methyl Chloride Salt/Dimethylaminoethylacrylate Benzyl Chloride Salt Dispersion Polymer Flocculant Containing Hyperbranched Monomers This example describes the preparation of dispersion polymer flocculants containing 19.3% polymer actives. The equipment used is described in Example 3, except the stirring shaft contains two pitched blade impellers.

In a large beaker are combined acrylamide (144.13 g, 47.6% aqueous solution), DMAEA.MCQ (34.44 g, 80.35% aqueous solution), dimethylaminoethylacrylate benzyl chloride salt (DMAEA.BCQ, 133.83 g, 71.7% aqueous solution), glycerol (5.00 g), poly(diallyldimethylammonium chloride/DMAEA.BCQ) (65.83 g, 15% aqueous solution) and ethylenediamine tetraacetic acid, tetrasodium salt (0.25 g). Hyperbranched monomer, prepared as described in Examples 1 and 2, is then added to the mixture. The amount is varied based on the weight of the monomer actives in ppm. For example, a 200 ppm level of hyperbranched monomer requires 0.0384 g of the reagent.

To the reactor is added ammonium sulfate (151.76 g) and deionized water (386.16 g) and the mixture is stirred until homogeneous. The monomer solution prepared above is then added to the reactor, the mixture is stirred (700 rpm) and warmed to 48° C. A nitrogen purge is then started and maintained throughout the reaction. Vazo-50 (2,2'-azobis(2-amidopropane dihydrochloride), 2.00 g, 1% aqueous solution, E.I. duPont de Nemours and Company, Wilmington, Del.) is then added to the reactor. After 2 hours, 3.0 g of the Vazo-50 solution is added. After 4 hours, Vazo-50 (3.00 g, 10% aqueous solution) is added. Six hours after the start of the reaction, ammonium sulfate (60.00 g) is added and the mixture stirred for 15 minutes. The reaction is then cooled to ambient temperature, acetic acid (10.0 g) is slowly added and the reaction mixture is stirred for 15 minutes to provide a 35 mole percent cationic polymer having 19.3% polymer actives.

Representative polymers prepared as described in Examples 2–5 are summarized in Table 1. In Table 1, Polymers I–XIII are acrylamide/dimethylaminoethyl acrylate methyl chloride quaternary salt latex polymers; Polymers XIV–XVII are 66 mole percent acrylamide/24 mole percent dimethylaminoethyl acrylate methyl chloride quaternary salt/10 mole percent dimethylaminoethyl acrylate benzyl chloride quaternary salt dispersion polymers; and polymers XVIII–XX are acrylamide/dimethylaminoethyl acrylate methyl chloride quaternary salt dry polymers. "MBA" is methylene(bis)acrylamide. "AGE" is allyl glycidyl ether modified Hybrane multiarm modifier.

TABLE 1

Reaction Summary for Nalco Flocculants Prepared using a Multiarm Vinyl Benzyl Monomer Modifier. (Unless Indicated)

| Sample ID | % Polym Actives | Mole % (+) Charge | Modifier* ppm | RSV (dL/g) | IV (dL/g) | Huggins Const. |
|---|---|---|---|---|---|---|
| A | 30 | 50 | | | | |
| I | " | " | 0 | 20.74 | 16.87 | 0.30 |
| II | " | " | 8 | 15.16 | 11.35 | 0.66 |
| III | " | " | 16 | 16.73 | 12.02 | 0.72 |
| IV | " | " | 150 | 4.77 | 3.21 | 3.36 |
| V | " | " | 225 | 4.13 | 2.93 | 3.12 |
| VII | " | " | 500 | 3.03 | 2.33 | 5.95 |
| VII | " | " | 1000 | 1.93 | 0.94 | 25.53 |
| B | 42.8 | 50 | | | | |
| VIII | " | " | 0 | 15.6 | — | — |
| IX | " | " | 16 | 10.4 | 5.78 | — |
| X | " | " | 26 | 8.9 | 6.95 | 0.89 |
| XI | " | " | 50 | 5.78 | 4.77 | 0.99 |
| XII | " | " | 60(AGE) | 15.07 | — | — |
| XIII | " | " | 200(AGE) | 5.94 | — | — |
| C | | | | | | |
| XIV | 19.3 | 30 | 0 | 22.2 | — | — |
| XV | " | " | 200 | 10.75 | — | — |
| XVI | " | " | 10(MBA) | gel | — | — |
| XVII | " | " | 3(MBA) | 10.82 | — | — |
| D | 45 | 50 | | | | |
| XVIII | " | " | 0 | 17.8 | — | — |
| XIX | " | " | 60 | gel | — | — |
| XX | " | " | 25 | 5.2 | — | — |

EXAMPLE 7

Centrifuge Bench Test

The centrifuge bench test procedure is as follows: The polymer is added to 20 ml of sludge in a centrifuge tube at the desired concentration and mixed using a vortex mixer for 10 seconds. The sludge is then centrifuged at 1000 G for 1 minute. This is followed by further mixing on the vortex mixer for 10 seconds. The flocs are then observed visually and a rating of 0–4 is given, with 4 being the best. A polymer that produces a rating of greater than 3 would be effective on the centrifuge. The bench test has been extensively correlated with actual performance on the centrifuge in field trials. The results are shown in Table 2.

TABLE 2

Centrifuge Bench Test Comparison Data (Modified vs Unmodified Polymers) on Midwestern U.S. Municipal Sludges[1]

| Data Set # | Sample # | Sample RSV (dL/g) | Dosage (1% Soln.,BOP) (except were indicated) | Floc. Rating |
|---|---|---|---|---|
| 1 | I | 20.7 | 0.35 | 0 |
| | | | 0.70 | 1 |
| | | | 1.00 | 1 |
| | III | 16.7 | 0.35 | 0 |
| | | | 0.70 | 1 |
| | | | 1.00 | 2 |
| | IV | 4.8 | 0.75 | 0 |
| | | | 1.00 | 2 |
| | | | 1.25 | 3 |
| | | | 1.50 | 4 |
| | | | 1.75 | 4 |
| 2 | I | 20.7 | 0.25 | 0 |
| | | | 0.50 | 2 |
| | | | 0.75 | 3 |
| | | | 1.00 | 2 |
| | IV | 4.8 | 1.00 | 2 |
| | | | 1.25 | 4 |
| | | | 1.50 | 4 |
| | V | 4.1 | 1.00 | 1 |
| | | | 1.25 | 3 |
| | | | 1.50 | 4 |

TABLE 2-continued

Centrifuge Bench Test Comparison Data (Modified vs Unmodified Polymers) on Midwestern U.S. Municipal Sludges[1]

| Data Set # | Sample # | Sample RSV (dL/g) | Dosage (1% Soln.,BOP) (except were indicated) | Floc. Rating |
|---|---|---|---|---|
| | VI | 3 | 1.00 | 0 |
| | | | 1.25 | 1 |
| | | | 1.50 | 3 |
| | VII | 1.9 | 1.00 | 0 |
| | | | 1.25 | 0 |
| | | | 1.50 | 0 |
| | | | 2.00 | 3 |
| 3 | VIII | 15.6 | 0.50 | 2 |
| | | | 0.75 | 2 |
| | | | 1.00 | 2 |
| | IX | 10.4 | 0.75 | 2 |
| | | | 1.00 | 2 |
| | | | 1.25 | 2 |
| | X | 8.9 | 0.75 | 2 |
| | | | 1.00 | 2 |
| | | | 1.25 | 2 |
| | XI | 5.8 | 0.75 | 1 |
| | | | 1.00 | 4 |
| | | | 1.25 | 4 |
| 4 | XIII | 5.9 | 0.25 | 0 |
| | | | 0.60 | 0 |
| | | | 0.75 | 4 |
| | | | 1.00 | 2 |
| | XI | 5.8 | 0.75 | 0 |
| | | | 1.00 | 0 |
| | | | 1.25 | 2 |
| | | | 1.50 | 4 |
| 5 | XIV | 17–23 | 0.50 | 0 |
| | | | 1.00 | 1 |
| | | | 1.50 | 1 |
| | | | 2.00 | 1 |
| | | | 2.50 | 1 |
| | | | 3.00 | 1 |
| | XV | 10.7 | 1.50 | 1 |
| | | | 2.00 | 2 |
| | | | 2.50 | 2 |
| | | | 2.75 | 3 |
| | | | 3.00 | 4 |
| | | | 2.50 | 2 |
| 6 | XIV | 17–23 | 1.00 | 0 |
| | | | 1.50 | 1 |
| | | | 2.00 | 1 |
| | | | 2.50 | 1 |
| | XV | 10.7 | 1.00 | 1 |
| | | | 1.50 | 2 |
| | | | 2.00 | 2 |
| | | | 2.50 | 2 |
| | | | 3.00 | 2 |
| | XVII | 10.5 | 1.00 | 0 |
| | | | 1.50 | 1 |
| | | | 2.00 | 1 |
| | | | 2.50 | 1 |
| | | | 3.00 | 1 |
| 7 | XIV | 17–23 | 1.50 | 0 |
| | | | 2.00 | 1 |
| | | | 2.50 | 1 |
| | | | 3.00 | 1 |
| | XV | 10.7 | 2.00 | 1 |
| | | | 2.60 | 1 |
| | | | 3.00 | 2 |
| | | | 3.50 | 4 |
| | XVII | 10.5 | 2.00 | 1 |
| | | | 2.60 | 1 |
| | | | 3.00 | 1 |
| | | | 3.50 | 2 |

[1]Data sets 1–3 and 5–7 are generated using sludge from a first municipal wastewater treatment facility and data set 4 is generated using sludge from a second municipal wastewater treatment facility.

As shown in Table 2, data sets 1,2 and 3, the use of the hyperbranched monomer in the latex flocculant formulation gave products that are superior to the control (no hyperbranched monomer) in the dewatering tests. The amount of hyperbranched monomer needed for the best performance is chosen such that the RSV of the product is between 4–8 dl/g. Furthermore, the amount of hyperbranced monomer needed to achieve the desired RSV is reduced as the total monomer percentage (i.e. higher polymer actives) in the formulation is increased.

As with the latex formulations, when the hyperbranched monomer is used in the dispersion formulation, an improvement in the high shear sludge dewatering testing performance is observed compared to the control. Furthermore, the hyperbranched modified flocculant out-performed a similar product prepared using methylenebis acrylamide (MBA). MBA is a common monomer used to lower a polymer's RSV, which indicates that the polymers of this invention outperform the existing MBA-modified dispersion polymers.

Although this invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

What is claimed is:

1. A water-soluble, cationic polymer comprising from about 1 to about 65 mole percent of one or more cationic monomers, from about 99 to about 35 mole percent of one or more nonionic monomers and from about 1 to about 1000 ppm, based on the total monomer content, of one or more hyperbranched monomers wherein the hyperbranched monomer contains from about 2 to about 20 allyl, vinyl, or acrylic end groups.

2. The polymer of claim 1 wherein the hyperbranched monomer contains from about 3 to about 15 allyl, vinyl, or acrylic end groups.

3. The polymer of claim 1 wherein the hyperbranched monomer contains from about 4 to about 10 allyl, vinyl, or acrylic end groups.

4. The polymer of claim 1 wherein the cationic monomers are selected from the group consisting of dialkylaminoalkyl acrylates and methacrylates and their quaternary or acid salts.

5. The polymer of claim 1 wherein the nonionic monomers are selected from acrylamide and methacrylamide.

6. The polymer of claim 1 wherein the hyperbranched monomer is a hyperbranched polyesteramide wherein the branches are terminated by tertiary amine end groups quaternized with allyl benzyl chloride, allyl chloride, allyl glycidyl ether or glycidyl methacrylate.

7. The polymer of claim 6 wherein the hyperbranched polyesteramide is a polycondensate of diisopropanolamine and hexahydrophthalic anhydride.

8. The polymer of claim 7 selected from the group of dispersion polymers and latex polymers having a RSV of from about 4 to about 12 dL/g.

9. A dispersion polymer according to claim 8 that contains from about 50 to about 500 ppm, based on total monomer content, of hyperbranched monomer and has a RSV of from about 5 to about 12.

10. A dispersion polymer according to claim 8 that contains from about 100 to about 300 ppm, based on total monomer content, of hyperbranched monomer and has a RSV of from about 5 to about 12 dL/g.

11. A latex polymer according to claim 8 that contains from about 5 to about 400 ppm, based on total monomer content, of hyperbranched monomer and has a RSV of from about 4 to about 8.

12. A latex polymer according to claim 8 that contains from about 8 to about 225 ppm, based on total monomer content, of hyperbranched monomer and has a RSV of from about 5 to about 12 dL/g.

13. A method of dewatering sludge comprising
   i) adding to the sludge an effective amount of one or more cationic, water-soluble polymers according to claim 1 to form a mixture of water and coagulated and flocculated solids and
   ii) separating the coagulated and flocculated solids from the water.

14. The method of claim 13 wherein the sludge is selected from the group consisting of municipal and industrial sludges.

15. The method of claim 14 wherein the sludge is a municipal sludge.

16. The method of claim 14 wherein the sludge is an activated sludge.

* * * * *